(12) United States Patent
Wu

(10) Patent No.: US 12,160,886 B2
(45) Date of Patent: Dec. 3, 2024

(54) CHANNEL ACCESS METHOD, TERMINAL DEVICE, AND NETWORK DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 407 days.

(21) Appl. No.: 17/565,195

(22) Filed: Dec. 29, 2021

(65) Prior Publication Data

US 2022/0124794 A1    Apr. 21, 2022

Related U.S. Application Data

(63) Continuation of application No. PCT/CN2020/097794, filed on Jun. 23, 2020.

(30) Foreign Application Priority Data

Jul. 10, 2019    (CN) .......................... 201910621467.0

(51) Int. Cl.
*H04W 74/00* (2009.01)
*H04W 74/08* (2024.01)
*H04W 74/0833* (2024.01)

(52) U.S. Cl.
CPC ..... *H04W 74/004* (2013.01); *H04W 74/0833* (2013.01)

(58) Field of Classification Search
CPC .......... H04W 74/0833; H04W 74/004; H04W 74/08; H04W 72/569
See application file for complete search history.

(56) References Cited

U.S. PATENT DOCUMENTS

| 10,805,950 B2 * | 10/2020 | Noh ........................ H04L 27/26 |
| 2008/0287127 A1 | 11/2008 | Wu et al. |
| 2016/0353387 A1 | 12/2016 | Gao et al. |
| 2017/0273056 A1 | 9/2017 | Papasakellariou |
| 2017/0289869 A1 | 10/2017 | Nogami et al. |
| 2019/0014596 A1 * | 1/2019 | Yang ..................... H04W 72/21 |
| 2019/0037601 A1 * | 1/2019 | Noh .................. H04W 72/0446 |
| 2019/0215217 A1 | 7/2019 | Kim et al. |

(Continued)

FOREIGN PATENT DOCUMENTS

| CN | 101755470 A | 6/2010 |
| CN | 104812046 A | 7/2015 |

(Continued)

OTHER PUBLICATIONS

Coexistence and channel access for NR unlicensed band operations, 3GPP TSG RAN WG1 Meeting #95, Nov. 12-Nov. 16, 2018, R1-1812194, Huawei, HiSilicon, Spokane, US.

(Continued)

*Primary Examiner* — Brian D Nguyen
(74) *Attorney, Agent, or Firm* — IP & T GROUP LLP

(57) ABSTRACT

A channel access method includes: determining a relationship between a PRACH resource and a PUSCH resource that are corresponding to channel access request information;

(Continued)

Send configuration information to a terminal device, where the configuration information is used to instruct the terminal device to: in a case that a time-domain interval between a PRACH resource and a PUSCH resource is less than or equal to a preset value, determine that channel access priority information corresponding to the PRACH resource and channel access priority information corresponding to the PUSCH resource are first channel access priority information; or the configuration information is used to instruct the terminal device to: in a case that a time-domain interval between a PRACH resource and a PUSCH resource is greater than a preset value, determine that channel access priority information corresponding to the PRACH resource is second channel access priority information, and determine, based on the second channel access priority information, channel access priority information corresponding to the PUSCH resource; or the configuration information is used to instruct the terminal device to: in a case that a time-domain interval between a PRACH resource and a PUSCH resource is greater than a preset value, determine that channel access priority information corresponding to the PUSCH resource is third channel access priority information, and determine, based on the third channel access priority information, channel access priority information corresponding to the PRACH resource

~201 and determining, based on the relationship, channel access priority information corresponding to the PRACH resource and channel access priority information corresponding to the PUSCH resource.

19 Claims, 4 Drawing Sheets

(56) References Cited

U.S. PATENT DOCUMENTS

| | | | |
|---|---|---|---|
| 2020/0178263 A1 | 6/2020 | Shao | |
| 2020/0280971 A1* | 9/2020 | Moon | H04L 5/0053 |
| 2022/0014337 A1* | 1/2022 | Ouchi | H04W 74/0808 |
| 2022/0095252 A1* | 3/2022 | Ko | H04L 5/0094 |
| 2022/0095376 A1* | 3/2022 | Yoon | H04W 74/0866 |
| 2022/0174751 A1* | 6/2022 | Shin | H04L 1/1893 |

FOREIGN PATENT DOCUMENTS

| | | |
|---|---|---|
| CN | 108886447 A | 11/2018 |
| CN | 109075914 A | 12/2018 |
| WO | 2019029454 A1 | 2/2019 |

OTHER PUBLICATIONS

Coexistence and channel access for NR unlicensed band operations, 3GPP TSG RAN WG1 Meeting #96bis, Apr. 8-12, 2019, R1-1903928, Huawei, HiSilicon, Xi'an, China.

Discussion on channel structure for 2-step RACH, 3GPP TSG RAN WG1 #98bis, Oct. 14-20, 2019, R1-1910198, vivo, Chongqing, China.

Discussion on the service based channel access priority, 3GPP TSG-RAN WG2 Meeting #103bis, Oct. 8-12, 2018, R2-1814269, vivo, Chengdu, China.

Discussion on the MsgA resource selection, 3GPP TSG-RAN WG2 Meeting #106, May 13-May 17, 2019, R2-1905655, vivo, Reno, USA.

2 Step RA: MsgA Aspects, 3GPP TSG-RAN2 106, May 13-May 17, 2019, R2-1905719, Samsung, Reno, USA.

First Office Action of priority application No. CN 201910621467.0 issued by the Chinese Patent Office on Nov. 17, 2021.

International Search Report and Written Opinion of priority application No. CN 201910621467.0 issued by the Chinese Patent Office on Sep. 24, 2020.

* cited by examiner

Send configuration information to a terminal device, where the configuration information is used to instruct the terminal device to: in a case that a time-domain interval between a PRACH resource and a PUSCH resource is less than or equal to a preset value, determine that channel access priority information corresponding to the PRACH resource and channel access priority information corresponding to the PUSCH resource are first channel access priority information; or the configuration information is used to instruct the terminal device to: in a case that a time-domain interval between a PRACH resource and a PUSCH resource is greater than a preset value, determine that channel access priority information corresponding to the PRACH resource is second channel access priority information, and determine, based on the second channel access priority information, channel access priority information corresponding to the PUSCH resource; or the configuration information is used to instruct the terminal device to: in a case that a time-domain interval between a PRACH resource and a PUSCH resource is greater than a preset value, determine that channel access priority information corresponding to the PUSCH resource is third channel access priority information, and determine, based on the third channel access priority information, channel access priority information corresponding to the PRACH resource ~201

FIG. 5

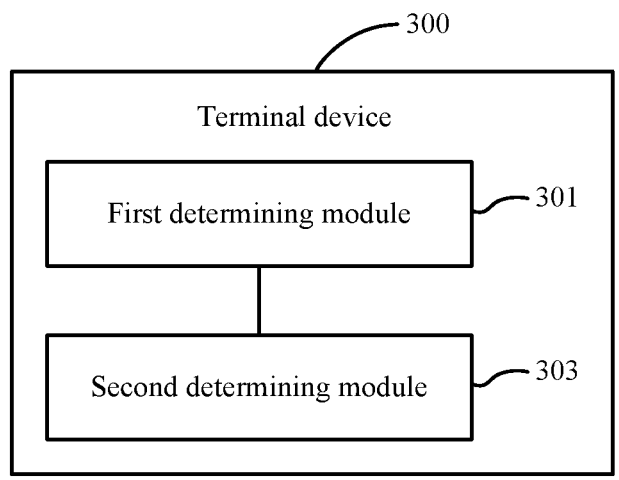

FIG. 6

CHANNEL ACCESS METHOD, TERMINAL DEVICE, AND NETWORK DEVICE

CROSS-REFERENCE TO RELATED APPLICATIONS

This application is a Bypass Continuation application of PCT/CN2020/097794, filed on Jun. 23, 2020, which claims priority to Chinese Patent Application No. 201910621467.0, filed on Jul. 10, 2019, which are incorporated herein by reference in their entirety.

TECHNICAL FIELD

The present disclosure relates to the communication field, and in particular, to a channel access method, a terminal device, and a network device.

BACKGROUND

Currently, in a new radio (NR) mobile communications system (an NR system), if an unlicensed frequency band is to be used for data receiving and sending, a transmit end of a signal needs to meet a use rule of the unlicensed frequency band. For the unlicensed frequency band, before sending the signal, the transmit end needs to monitor whether the frequency band is occupied (or idle). If the frequency band is not occupied (or idle), the transmit end may send the signal, and the transmit end may continuously send the signal for a period of time (that is, channel occupancy time (COT)).

SUMMARY

According to a first aspect, the embodiments of the present disclosure provide a channel access method, applied to a terminal device and including:
 determining a relationship between a physical random access channel (PRACH) resource and a physical uplink shared channel (PUSCH) resource that are corresponding to channel access request information; and
 determining, based on the relationship, channel access priority information corresponding to the PRACH resource and channel access priority information corresponding to the PUSCH resource.

According to a second aspect, the embodiments of the present disclosure provide a channel access method, applied to a network device and including:
 sending configuration information to a terminal device, where
 the configuration information is used to instruct the terminal device to: in a case that a time-domain interval between a PRACH resource and a PUSCH resource that are corresponding to channel access request information is less than or equal to a preset value, determine that channel access priority information corresponding to the PRACH resource and channel access priority information corresponding to the PUSCH resource are first channel access priority information; or
 the configuration information is used to instruct the terminal device to: in a case that a time-domain interval between a PRACH resource and a PUSCH resource is greater than a preset value, determine that channel access priority information corresponding to the PRACH resource is second channel access priority information, and determine, based on the second channel access priority information, channel access priority information corresponding to the PUSCH resource; or
 the configuration information is used to instruct the terminal device to: in a case that a time-domain interval between a PRACH resource and a PUSCH resource is greater than a preset value, determine that channel access priority information corresponding to the PUSCH resource is third channel access priority information, and determine, based on the third channel access priority information, channel access priority information corresponding to the PRACH resource.

According to a third aspect, the embodiments of the present disclosure provide a terminal device, and the terminal device includes:
 a first determining module, configured to determine a relationship between a PRACH resource and a PUSCH resource that are corresponding to channel access request information; and
 a second determining module, configured to determine, based on the relationship, channel access priority information corresponding to the PRACH resource and channel access priority information corresponding to the PUSCH resource.

According to a fourth aspect, the embodiments of the present disclosure provide a terminal device, including a memory, a processor, and a computer program that is stored in the memory and executable on the processor, where when the computer program is executed by the processor, the steps of the method in the first aspect are implemented.

According to a fifth aspect, the embodiments of the present disclosure provide a computer-readable storage medium, where the computer-readable storage medium stores a computer program, and when the computer program is executed by a processor, the steps of the method in the first aspect are implemented.

According to a sixth aspect, the embodiments of the present disclosure provide a network device, and the network device includes:
 a transmit module, configured to send configuration information to a terminal device, where
 the configuration information is used to instruct the terminal device to: in a case that a time-domain interval between a PRACH resource and a PUSCH resource that are corresponding to channel access request information is less than or equal to a preset value, determine that channel access priority information corresponding to the PRACH resource and channel access priority information corresponding to the PUSCH resource are first channel access priority information; or
 the configuration information is used to instruct the terminal device to: in a case that a time-domain interval between a PRACH resource and a PUSCH resource is greater than a preset value, determine that channel access priority information corresponding to the PRACH resource is second channel access priority information, and determine, based on the second channel access priority information, channel access priority information corresponding to the PUSCH resource; or
 the configuration information is used to instruct the terminal device to: in a case that a time-domain interval between a PRACH resource and a PUSCH resource is greater than a preset value, determine that channel access priority information corresponding to the PUSCH resource is third channel access priority information, and determine, based on the third channel access priority information, channel access priority information corresponding to the PRACH resource.

According to a seventh aspect, the embodiments of the present disclosure provide a network device, including a memory, a processor, and a computer program that is stored in the memory and executable on the processor, where when the computer program is executed by the processor, the steps of the method in the second aspect are implemented.

According to an eighth aspect, the embodiments of the present disclosure provide a non-transitory computer-readable storage medium, where the non-transitory computer-readable storage medium stores a computer program, and when the computer program is executed by a processor, the steps of the method in the second aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings:

FIG. 5 is a schematic flowchart of a second channel access method according to an embodiment of the present disclosure;

FIG. 6 is a schematic structural diagram of a terminal device according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

In a current design of the NR system, different channel access priority classes (CAPC) and channel access types (CAT) are used for different physical channels. For different channel access priority classes, duration in which the transmit end monitors whether the unlicensed frequency band is idle is different. For example, for a case that a channel access priority class is relatively high, duration in which the transmit end monitors whether the unlicensed frequency band is idle is shorter, that is, the transmit end obtains an available frequency use permission by using shorter monitoring time.

Figure 1:
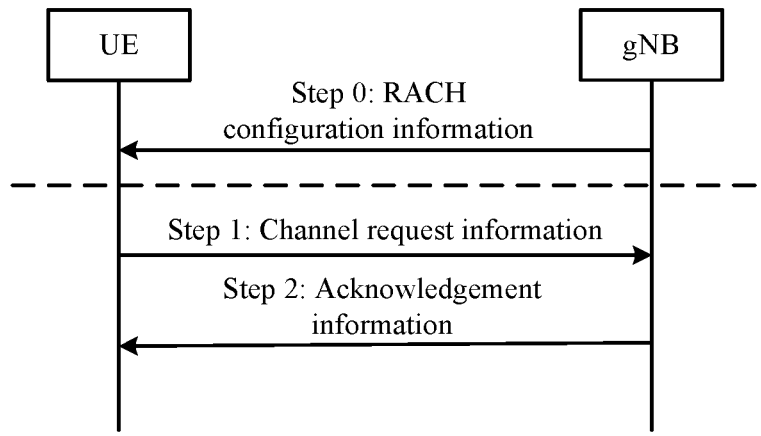
FIG. 1 is a schematic diagram of a 2-step random access process in the prior art.

In addition, an existing 2-step random access process generally includes three steps shown in FIG. 1.

Step 0: A network side (that is, a 5G base station gNB) configures configuration information of a 2-step random access process (2-Step RACH configuration) for user equipment (UE) (that is, a transmit end), for example, sending resource information channel request corresponding to channel request information MsgA and acknowledgement information MsgB, where the MsgA includes data information and control information.

Step 1: The UE triggers the 2-step RACH process, and sends the channel request information MsgA to the network side, for example, sends the data information to the network side by using a PUSCH, and may also send the control information to the network side by using a PRACH.

Step 2: The network side sends the acknowledgement information MsgB to the UE. If the UE fails to receive the acknowledgement information MsgB, the UE resends the channel request information MsgA.

It can be learned from above that, for the foregoing process of sending the channel request information MsgA of the 2-step RACH, because a case that the two physical channels PRACH and PUSCH are simultaneously sent exists, a reliability problem of sending the channel request information MsgA needs to be resolved.

For the 2-step random access process described in the background, generally, a CAPC and a CAT of the PRACH and a CAPC and a CAT of the PUSCH are fixed values specified by a protocol, for example, the CAPC is a highest class. An uplink grant for dynamic scheduling may be indicated by using scheduling information, for example, may be indicated by using downlink control information (DCI), and the configured uplink grant may be determined based on a data type of a sent logical channel. For example, a high priority class of sent data indicates a high channel access priority class.

However, for sending of the MsgA in the 2-step random access process, if there is a case that the two physical channels PRACH and PUSCH are simultaneously sent, if a difference between channel access priority information of the two channels is relatively large, one channel is more likely to be successfully sent, and the other channel is less likely to be successfully sent, thereby resulting a sending failure of the MsgA. Optionally, if the PRACH and the PUSCH corresponding to the MsgA need to be sent in shared channel access time (shared COT), that is, the UE can send the PRACH and the PUSCH by performing channel access only once, a type of channel access priority information to be used by the UE to perform channel access needs to be determined.

Therefore, a channel access solution that can resolve at least one of the foregoing problems needs to be proposed.

The following describes in detail the technical solutions provided in the embodiments of the present disclosure with reference to the accompanying drawings.

Figure 2:
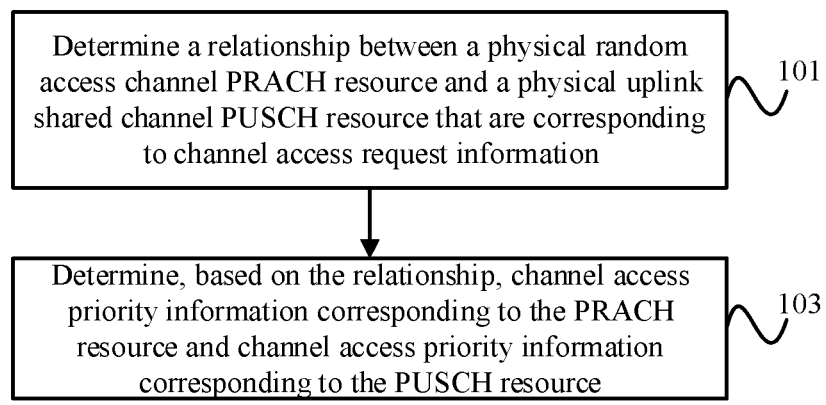
FIG. 2 is a schematic flowchart of a first channel access method according to an embodiment of the present disclosure.

Referring to FIG. 2, an embodiment of the present disclosure provides a channel access method. The method is performed by a terminal device and includes steps of the following procedure.

Step 101: Determine a relationship between a PRACH resource and a PUSCH resource that are corresponding to channel access request information.

Optionally, the channel access request information is a MsgA in a 2-step random access process, and the MsgA includes data information sent by using a PUSCH and control information sent by using a PRACH.

Optionally, the terminal device may learn the relationship between the PRACH resource and the PUSCH resource based on related configuration information received from a network device side.

Step 103: Determine, based on the relationship, channel access priority information corresponding to the PRACH resource and channel access priority information corresponding to the PUSCH resource.

In this embodiment of the present disclosure, in a process of performing channel access based on channel access request information, channel access priority information corresponding to a PRACH resource and a PUSCH resource is determined based on a relationship between the PRACH resource and the PUSCH resource that are corresponding to the channel access request information, that is, sending of two channels PRACH and PUSCH can use a more reasonable channel access manner. In this way, reliability of sending channel access request information can be improved. In addition, the relationship between the PRACH resource and the PUSCH resource is fully considered when the channel access priority information corresponding to the PRACH resource and the channel access priority information corresponding to the PUSCH resource are determined, thereby ensuring fairness of access of different physical channels.

Optionally, in the channel access method in this embodiment of the present disclosure, the channel access priority information includes at least one of a CAPC or a CAT.

It can be understood that, to improve reliability of sending the channel access request information, when the relationship between the PRACH resource and the PUSCH resource corresponding to the channel access request information has a plurality of cases, the channel access priority information corresponding to the PRACH resource and the channel access priority information corresponding to the PUSCH resource may be determined in different manners for different specific relationships. The following descriptions are provided with reference to different embodiments.

Embodiment 1

In the embodiment 1, optionally, step 103 may be performed as follows:

In a case that a time-domain interval between the PRACH resource and the PUSCH resource is less than or equal to a preset value, it is determined that the channel access priority information corresponding to the PRACH resource and the channel access priority information corresponding to the PUSCH resource are first channel access priority information.

Figure 3:
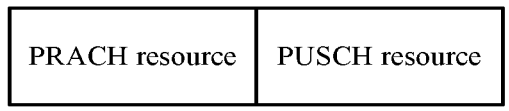
FIG. 3 is a schematic diagram of a first correspondence between a PRACH resource and a physical uplink control channel (PUCCH) resource according to an embodiment of the present disclosure.

It can be understood that, when the relationship between the PRACH resource and the PUSCH resource is that the time-domain interval is less than or equal to the preset value, that is, when the PRACH resource and the PUSCH resource are relatively close to each other in time domain, as shown in FIG. 3, the terminal device may separately send a PRACH and a PUSCH on the PRACH resource and the PUSCH resource that are corresponding to the channel access request information after detecting an idle state (or a success) in one channel access detection. In this case, channel access priority information used to send access channels PRACH and PUSCH may be determined as the same first channel access priority information. In this way, a type of channel access priority information used for sending the PRACH and the PUSCH that are corresponding to the channel access request information in shared COT can be determined.

The preset value may be specifically limited based on an actual situation.

Optionally, the first channel access priority information is determined in one of the following manners:

(1) Being specified by a protocol

Optionally, a fixed value specified in a protocol is determined as the first channel access priority information, for example, CAPC=1 and CAT=1.

(2) Being configured by a network device

Optionally, the first channel access priority information is determined based on content configured by a network device. For example, the network device triggers a 2-step random access process of the terminal device by sending DCI, and the DCI may indicate the first channel access priority information corresponding to the channel access request information, for example, CAPC=1 and CAT=1.

(3) Being determined based on channel access priority information corresponding to service information related to an object transmitted on the PUSCH resource.

Optionally, if the object transmitted based on the PUSCH resource may include at least data and signaling, the first channel access priority information may be determined based on channel access priority information corresponding to service information related to the data or the signaling.

Optionally, in this embodiment of the present disclosure, the service information includes at least one of the following:

a logical channel identifier;
a logical channel group identifier;
a logical channel priority class;
a cell identifier corresponding to a logical channel;
a cell type identifier corresponding to a logical channel;
a cell group corresponding to a logical channel;
a data type; or
a control signaling type.

The following uses an example to describe a case that the first channel access priority information is determined based on the channel access priority information corresponding to the service information.

In a case that the service information is a logical channel identifier, channel access priority information corresponding to data whose logical channel identifier is 1 may be determined as the first channel access priority information, for example, CAPC=1 and CAT=1.

In a case that the service information is a logical channel group identifier, channel access priority information corresponding to data whose logical channel group identifier is 1 may be determined as the first channel access priority information, for example, CAPC=1 and CAT=1.

In a case that the service information is a logical channel priority class, channel access priority information corresponding to data whose logical channel priority class is 1 or 2 may be determined as the first channel access priority information, for example, CAPC=1 and CAT=1 or CAPC=2 and CAT=1.

In a case that the service information is a cell identifier corresponding to a logical channel, channel access priority information corresponding to data of a logical channel 1 that can be sent only by using an uplink grant whose cell identifier is 1 may be determined as the first channel access priority information, for example, CAPC=1 and CAT=1.

In a case that the service information is a cell type identifier corresponding to a logical channel, channel access priority information corresponding to data of a logical channel 1 that can be sent only by using an uplink grant whose cell type identifier is a primary cell (PCell) may be determined as the first channel access priority information, for example, CAPC=1 and CAT=1. The cell type identifier may further include a primary secondary cell (PS Cell) or a secondary cell (SCell).

In a case that the service information is a cell group corresponding to a logical channel, channel access priority information corresponding to data of a logical channel 1 that can be sent only by using an uplink grant of a master cell group (MCG) may be determined as the first channel access priority information, for example, CAPC=1 and CAT=1. The cell group may further include a secondary cell group (SCG).

In a case that the service information is a data type, channel access priority information corresponding to data whose data type is a buffer status report medium access control element (BSR MAC CE) may be determined as the first channel access priority information, for example, CAPC=1 and CAT=1. The data type may further include radio resource control (RRC) signaling, a MAC CE, or common data (for example, data of a dedicated service channel (DTCH) and a data radio bearer (DRB)).

In a case that the service information is a control signaling type, channel access priority information corresponding to dedicated control channel (DCCH) control signaling SRB1 or SRB2 may be determined as the first channel access priority information, for example, CAPC=1 and CAT=1 or CAPC=2 and CAT=1. The control signaling type may further include a common control channel (CCCH).

Optionally, the channel access priority information corresponding to the service information related to the object transmitted on the PUSCH resource may be determined through specified by a protocol or configured by a network device.

Optionally, in a case that the first channel access priority information is determined based on the channel access priority information corresponding to the service information related to the object transmitted on the PUSCH resource, if there are a plurality of types of the service information related to the object, and channel access priority information corresponding to different types of service information is different, target channel access priority information with a highest CAPC or a lowest CAPC is determined as the first channel access priority information.

It can be understood that the first channel access priority information may be the channel access priority information with the highest CAPC or a lowest CAPC in the channel access priority information corresponding to the service information related to the object transmitted on the PUSCH resource. In particular, in a case that there are the plurality of types of the service information related to the object transmitted on the PUSCH resource, and the channel access priority information corresponding to the different types of service information is different, the target channel access priority information with the highest CAPC or the lowest CAPC is determined as the first channel access priority information.

For example, a PUSCH in a MsgA includes both data whose logical channel priority class is 1 and data whose logical channel priority class is 2, where a CAPC in "channel access priority information" (for example, CAPC=1 and CAT=1) corresponding to the logical channel priority class 1 is higher than a CAPC in "channel access priority information" (for example, CAPC=2 and CAT=1) corresponding to the logical channel priority class 2. In this case, the "channel access priority information" corresponding to the logical channel priority class 1 is used as "channel access priority information" of the MsgA, or the "channel access priority information" corresponding to the logical channel priority class 2 is used as "channel access priority information" of the MsgA.

Optionally, a CAPC in the channel access priority information corresponding to the service information related to the object transmitted on the PUSCH resource is specified by a protocol; the CAPC is determined based on at least one of the following rules.

A higher logical channel priority class corresponds to a higher CAPC. For example, a CAPC corresponding to data whose logical channel priority class is 1 is higher than a CAPC corresponding to data whose logical channel priority class is 2.

Data with a smaller or larger logical channel number corresponds to a higher CAPC. For example, a CAPC corresponding to data whose logical channel number is 1 is higher than or lower than a CAPC corresponding to data whose logical channel number is 2.

A CAPC corresponding to RRC signaling is higher than a CAPC corresponding to data. For example, a CAPC corresponding to data of an SRB is higher than a CAPC corresponding to data of a DRB.

A CAPC corresponding to a preset MAC CE is higher than or lower than the CAPC corresponding to the data. For example, a CAPC corresponding to a cell radio network temporary identifier (C-RNTI) MAC CE is higher than a CAPC corresponding to data of a DRB, and a CAPC corresponding to a padding BSR MAC CE is lower than the CAPC corresponding to the data of the DRB.

A CAPC corresponding to a preset first signaling radio bearer SRB is higher than or lower than a CAPC corresponding to a preset second SRB. For example, the first SRB is an SRB1, and the second SRB is an SRB2.

The CAPC corresponding to the preset MAC CE is higher than or lower than a CAPC corresponding to preset RRC signaling. For example, a CAPC corresponding to a C-RNTIMAC CE is higher than a CAPC corresponding to the SRB2, and the CAPC corresponding to the padding BSR MAC CE is lower than a CAPC corresponding to the SRB1.

(4) Being determined based on a trigger event of RACH access.

Optionally, channel access priority information corresponding to the trigger event of RACH access is directly determined as the first channel access priority information.

Optionally, the channel access priority information determined based on the trigger event of RACH access may be determined through specified by a protocol or configured by a network device, that is, the channel access priority information corresponding to the trigger event of RACH access is determined through protocol agreement or configured by a network device.

Optionally, in this embodiment of the present disclosure, the trigger event includes one of the following:
initial access in an RRC idle state;
RRC connection re-establishment;
a case that data in an RRC connected state arrives, and an uplink synchronization state is out-of-synchronization;
a case that uplink data in an RRC connected state arrives, and no PUCCH resource is used to send a scheduling request SR;
an SR failure;
a synchronous reconfiguration request;

conversion of an RRC inactive state;
establishment of uplink timing of a SCell;
a system information request; and
a beam failure recovery.

For example, when the trigger event of RACH access is initial access in an RRC idle state, channel access priority information corresponding to the initial access in the RRC idle state may be determined as the first channel access priority information, for example, CAPC=2 and CAT=1.

When the trigger event of RACH access is a beam failure recovery, channel access priority information corresponding to the beam failure recovery may be determined as the first channel access priority information, for example, CAPC=1 and CAT=1.

It should be noted that the uplink timing of the SCell is generally a timing advance sent through an uplink signal, and the uplink timing of the SCell is generally obtained by initiating a random access process and delivered by the network device to the terminal device. The system information request is for system information that is not broadcast on a network side.

(5) In a case that the trigger event of RACH access is that the target data arrives, being determined based on channel access priority information corresponding to service information related to the target data.

It can be understood that arriving of the target data may be arriving of uplink data or downlink data, and in a case that the trigger event of RACH access is arriving of uplink data or downlink data, the first channel access priority information may be determined based on channel access priority information corresponding to service information related to the uplink data or the downlink data.

Optionally, the target data may include uplink data or downlink data in an RRC connected state.

Optionally, content included in the service information related to the target data may be similar to the service information related to the object transmitted on the PUSCH resource. Optionally, the manner of determining the first channel access priority information based on the channel access priority information corresponding to the service information related to the target data is also similar to the manner of determining the first channel access priority information based on the channel access priority information corresponding to the service information related to the object transmitted on the PUSCH resource. Details are not described herein again.

Embodiment 2

In the embodiment 2, optionally, step 103 may be performed as follows:

In a case that a time-domain interval between the PRACH resource and the PUSCH resource is greater than a preset value, it is determined that the channel access priority information corresponding to the PRACH resource is second channel access priority information; and
the channel access priority information corresponding to the PUSCH resource is determined based on the second channel access priority information.

Figure 4:
FIG. 4 is a schematic diagram of a second correspondence between a PRACH resource and a PUCCH resource according to an embodiment of the present disclosure.

It can be understood that when the relationship between the PRACH resource and the PUSCH resource is that the time-domain interval is greater than the preset value, that is, when the PRACH resource and the PUSCH resource are far away from each other in time domain, as shown in FIG. 4, the terminal device needs to perform channel access detection twice to send channel access request information: one time for sending the PRACH on the PRACH resource and one time for sending the PUSCH on the PUSCH resource. In this case, the second channel access priority information used to send an access channel PRACH may be first determined, and then channel access priority information used to send a PUSCH is determined based on the second channel access priority information after the second channel access priority information is determined. In this way, a case that a difference between channel access priority information of two channels is relatively large when the PRACH and the PUSCH that are corresponding to the channel access request information are separately sent in non-shared COT can be avoided, thereby avoiding a channel access request information sending failure and improving channel access efficiency.

Optionally, the channel access priority information used to send the PUSCH, that is, the channel access priority information corresponding to the PUSCH resource, is the same as the second channel access priority information.

The preset value may be specifically limited based on an actual situation.

Optionally, the second channel access priority information is determined in one of the following manners:
(1) being specified by a protocol;
(2) being configured by a network device;
(3) being determined based on a trigger event of RACH access; and
(4) in a case that the trigger event of RACH access is that the target data arrives, being determined based on channel access priority information corresponding to service information related to the target data.

It should be noted that, content of the manners of the specified by a protocol, configured by the network device, being determined based on the trigger event of RACH access, and in a case that the trigger event of RACH access is that the target data arrives, being determined based on the channel access priority information corresponding to the service information related to the target data in the embodiment 2 is the same as content described in (1), (2), (4), and (5) in the foregoing embodiment 1. Details are not described herein again.

Embodiment 3

In the embodiment 3, optionally, step 103 may be performed as follows:

In a case that a time-domain interval between the PRACH resource and the PUSCH resource is greater than a preset value, it is determined that the channel access priority information corresponding to the PUSCH resource is third channel access priority information; and
the channel access priority information corresponding to the PRACH resource is determined based on the third channel access priority information.

It can be understood that when the relationship between the PRACH resource and the PUSCH resource is that the time-domain interval is greater than the preset value, that is, when the PRACH resource and the PUSCH resource are far away from each other in time domain, as shown in FIG. 4, the terminal device needs to perform channel access detection twice to send channel access request information: one time for sending the PRACH on the PRACH resource and one time for sending the PUSCH on the PUSCH resource. In this case, the third channel access priority information used to send an access channel PUSCH may be first determined, and then channel access priority information used to send a PRACH is determined based on the third channel access priority information after the third channel access priority information is determined. In this way, a case that a difference between channel access priority information of two channels is relatively large when the PRACH and the PUSCH that are corresponding to the channel access request information are separately sent in non-shared COT can be avoided, thereby avoiding a channel access request information sending failure and improving channel access efficiency.

Optionally, the channel access priority information used to send the PRACH, that is, the channel access priority information corresponding to the PRACH resource, is the same as the third channel access priority information.

The preset value may be specifically limited based on an actual situation.

Optionally, the third channel access priority information is determined in one of the following manners:
(1) being specified by a protocol;
(2) being configured by a network device;
(3) being determined based on channel access priority information corresponding to service information related to an object transmitted on the PUSCH resource;
(4) being determined based on a trigger event of RACH access; and
(5) in a case that the trigger event of RACH access is that the target data arrives, being determined based on channel access priority information corresponding to service information related to the target data.

It should be noted that, content of the manners of the specified by a protocol, configured by the network device, being determined based on the channel access priority information corresponding to the service information related to the object transmitted on the PUSCH resource, being determined based on the trigger event of RACH access, and in a case that the trigger event of RACH access is that the target data arrives, being determined based on the channel access priority information corresponding to the service information related to the target data in the embodiment 3 is the same as content described in (1), (2), (3), (4), and (5) in the foregoing embodiment 1. Details are not described herein again.

Referring to FIG. 5, an embodiment of the present disclosure provides a channel access method. The channel access method is performed by a network device and may include steps of the following procedure.

Step 201: Send configuration information to a terminal device.

The configuration information is used to instruct the terminal device to: in a case that a time-domain interval between a PRACH resource and a PUSCH resource that are corresponding to channel access request information is less than or equal to a preset value, determine that channel access priority information corresponding to the PRACH resource and channel access priority information corresponding to the PUSCH resource are first channel access priority information; or
the configuration information is used to instruct the terminal device to: in a case that a time-domain interval between a PRACH resource and a PUSCH resource is greater than a preset value, determine that channel access priority information corresponding to the PRACH resource is second channel access priority information, and determine, based on the second channel access priority information, channel access priority information corresponding to the PUSCH resource; or
the configuration information is used to instruct the terminal device to: in a case that a time-domain interval between a PRACH resource and a PUSCH resource is greater than a preset value, determine that channel access priority information corresponding to the PUSCH resource is third channel access priority information, and determine, based on the third channel access priority information, channel access priority information corresponding to the PRACH resource.

In this embodiment of the present disclosure, the configuration information is used to indicate, to the terminal device, the relationship between the PRACH resource and the PUSCH resource that are corresponding to the channel access request information, so that the terminal device determines, based on the relationship, the channel access priority information corresponding to the PRACH resource and the channel access priority information corresponding to the PUSCH resource, and sending of two channels PRACH and PUSCH can use a more reasonable channel access manner. In this way, reliability of sending channel access request information can be improved. In addition, the relationship between the PRACH resource and the PUSCH resource is fully considered when the channel access priority information corresponding to the PRACH resource and the channel access priority information corresponding to the PUSCH resource are determined, thereby ensuring fairness of access of different physical channels.

Optionally, in a case that the configuration information indicates that the time-domain interval between the PRACH resource and the PUSCH resource that are corresponding to the channel access request information is less than or equal to the preset value, the terminal device may determine that the channel access priority information corresponding to the PRACH resource and the channel access priority information corresponding to the PUSCH resource are the first channel access priority information. That is, when the PRACH resource and the PUSCH resource are relatively close to each other in time domain, as shown in FIG. 3, the terminal device may separately send a PRACH and a PUSCH on the PRACH resource and the PUSCH resource that are corresponding to the channel access request information after detecting an idle state (or a success) in one channel access detection. In this case, channel access priority information used to send access channels PRACH and PUSCH may be determined as the same first channel access priority information. In this way, a type of channel access priority information used for sending the PRACH and the PUSCH that are corresponding to the channel access request information in shared COT can be determined.

In a case that the configuration information indicates that the time-domain interval between the PRACH resource and the PUSCH resource that are corresponding to the channel access request information is greater than the preset value, the terminal device may first determine that the channel access priority information corresponding to the PRACH resource is the second channel access priority information, and then determine, based on the second channel access priority information after determining the second channel access priority information, channel access priority information used to send a PUSCH; or the terminal device may first determine that the channel access priority information corresponding to the PUSCH resource is the third channel access priority information, and then determine, based on the third channel access priority information after determining the third channel access priority information, channel access priority information used to send a PRACH.

That is, when the PRACH resource and the PUSCH resource are far away from each other in time domain, as shown in FIG. 4, the terminal device needs to perform channel access detection twice to send channel access request information: one time for sending the PRACH on the PRACH resource and one time for sending the PUSCH on the PUSCH resource. In this way, a case that a difference between channel access priority information of two channels is relatively large when the PRACH and the PUSCH that are corresponding to the channel access request information are separately sent in non-shared COT can be avoided, thereby avoiding a channel access request information sending failure and improving channel access efficiency.

Optionally, the channel access request information is a MsgA in a 2-step random access process, and the MsgA includes data information sent by using a PUSCH and control information sent by using a PRACH.

Optionally, the first channel access priority information and the third channel access priority information are determined in one of the following manners:
(1) being specified by a protocol;
(2) being configured by a network device;
(3) being determined based on channel access priority information corresponding to service information related to an object transmitted on the PUSCH resource;
(4) being determined based on a trigger event of RACH access; and
(5) in a case that the trigger event of RACH access is that the target data arrives, being determined based on channel access priority information corresponding to service information related to the target data.

It should be noted that, content of the manners of the specified by a protocol, configured by the network device, being determined based on the channel access priority information corresponding to the service information related to the object transmitted on the PUSCH resource, being determined based on the trigger event of RACH access, and in a case that the trigger event of RACH access is that the target data arrives, being determined based on the channel access priority information corresponding to the service information related to the target data in this embodiment is the same as content described in (1), (2), (3), (4), and (5) in the foregoing embodiment 1 of the channel access method performed by the terminal device. Details are not described herein again.

Optionally, the second channel access priority information is determined in one of the following manners:
(1) being specified by a protocol;
(2) being configured by a network device;
(3) being determined based on a trigger event of RACH access; and
(4) in a case that the trigger event of RACH access is that the target data arrives, being determined based on channel access priority information corresponding to service information related to the target data.

It should be noted that, content of the manners of the specified by a protocol, configured by the network device, being determined based on the trigger event of RACH access, and in a case that the trigger event of RACH access is that the target data arrives, being determined based on the channel access priority information corresponding to the service information related to the target data in this embodiment is the same as content described in (1), (2), (4), and (5) in the foregoing embodiment 1 of the channel access method performed by the terminal device. Details are not described herein again.

Optionally, the channel access priority information includes at least one of a CAPC or a CAT.

Referring to FIG. 6, an embodiment of the present disclosure provides a terminal device 300. The terminal device 300 includes:
a first determining module 301, configured to determine a relationship between a PRACH resource and a PUSCH resource that are corresponding to channel access request information; and
a second determining module 303, configured to determine, based on the relationship, channel access priority information corresponding to the PRACH resource and channel access priority information corresponding to the PUSCH resource.

Optionally, in the terminal device 300 in this embodiment of the present disclosure, the channel access priority information includes at least one of a CAPC or a CAT.

Optionally, in the terminal device 300 in this embodiment of the present disclosure, the second determining module 303 may be configured to:
in a case that a time-domain interval between the PRACH resource and the PUSCH resource is less than or equal to a preset value, determine that the channel access priority information corresponding to the PRACH resource and the channel access priority information corresponding to the PUSCH resource are first channel access priority information.

Optionally, in the terminal device 300 in this embodiment of the present disclosure, the first channel access priority information is determined in one of the following manners:
specified by a protocol;
configured by a network device;
being determined based on channel access priority information corresponding to service information related to an object transmitted on the PUSCH resource;
being determined based on a trigger event of RACH access; and
in a case that the trigger event of RACH access is that the target data arrives, being determined based on channel access priority information corresponding to service information related to the target data.

Optionally, in the terminal device 300 in this embodiment of the present disclosure, the second determining module 303 may be configured to:
in a case that a time-domain interval between the PRACH resource and the PUSCH resource is greater than a preset value, determine that the channel access priority information corresponding to the PRACH resource is second channel access priority information; and
determine, based on the second channel access priority information, the channel access priority information corresponding to the PUSCH resource.

Optionally, in the terminal device 300 in this embodiment of the present disclosure, the second channel access priority information is determined in one of the following manners:
specified by a protocol;
configured a network device;
being determined based on a trigger event of RACH access; and
in a case that the trigger event of RACH access is that the target data arrives, being determined based on channel access priority information corresponding to service information related to the target data.

Optionally, in the terminal device 300 in this embodiment of the present disclosure, the second determining module 303 may be configured to:
in a case that a time-domain interval between the PRACH resource and the PUSCH resource is greater than a preset value, determine that the channel access priority information corresponding to the PUSCH resource is third channel access priority information; and determine, based on the third channel access priority information, the channel access priority information corresponding to the PRACH resource.

Optionally, in the terminal device 300 in this embodiment of the present disclosure, the third channel access priority information is determined in one of the following manners:
specified by a protocol;
configured by a network device;
being determined based on channel access priority information corresponding to service information related to an object transmitted on the PUSCH resource;
being determined based on a trigger event of RACH access; and
in a case that the trigger event of RACH access is that the target data arrives, being determined based on channel access priority information corresponding to service information related to the target data.

Optionally, in the terminal device 300 in this embodiment of the present disclosure, the service information includes at least one of the following:
a logical channel identifier;
a logical channel group identifier;
a logical channel priority class;
a cell identifier corresponding to a logical channel;
a cell type identifier corresponding to a logical channel;
a cell group corresponding to a logical channel;
a data type; or
a control signaling type.

Optionally, in the terminal device 300 in this embodiment of the present disclosure, in a case that the first channel access priority information is determined based on the channel access priority information corresponding to the service information related to the object transmitted on the PUSCH resource, if there are a plurality of types of the service information related to the object, and channel access priority information corresponding to different types of service information is different, target channel access priority information with a highest CAPC or a lowest CAPC is determined as the first channel access priority information.

Optionally, in the terminal device 300 in this embodiment of the present disclosure, the trigger event includes one of the following:
initial access in an RRC idle state;
RRC connection re-establishment;
a case that data in an RRC connected state arrives, and an uplink synchronization state is out-of-synchronization;
a case that uplink data in an RRC connected state arrives, and no PUCCH resource is used to send a scheduling request SR;
an SR failure;
a synchronous reconfiguration request;
conversion of an RRC inactive state;
establishment of uplink timing of a SCell;
a system information request; and
a beam failure recovery.

Optionally, in the terminal device 300 in this embodiment of the present disclosure, channel access priority information determined based on the trigger event is configured by a network device or specified by a protocol.

Optionally, in the terminal device 300 in this embodiment of the present disclosure, a CAPC in the channel access priority information corresponding to the service information related to the object transmitted on the PUSCH resource is specified by a protocol, where the CAPC is determined based on at least one of the following rules:
a higher logical channel priority class corresponds to a higher CAPC;
data with a smaller or larger logical channel number corresponds to a higher CAPC;
a CAPC corresponding to RRC signaling is higher than a CAPC corresponding to data;
a CAPC corresponding to a preset MAC CE is higher than or lower than the CAPC corresponding to the data;
a CAPC corresponding to a preset SRB is higher than or lower than a CAPC corresponding to a preset second SRB; or
the CAPC corresponding to the preset MAC CE is higher than or lower than a CAPC corresponding to preset RRC signaling.

Optionally, in the terminal device 300 in this embodiment of the present disclosure, the channel access request information is information MsgA in a 2-step random access process.

It can be understood that the terminal device 300 provided in this embodiment of the present disclosure can implement the above channel access method performed by the terminal device 300, and relevant descriptions of the channel access method is applicable to the terminal device 300. Details are not described herein again.

In this embodiment of the present disclosure, in a process of performing channel access based on channel access request information, channel access priority information corresponding to a PRACH resource and a PUSCH resource is determined based on a relationship between the PRACH resource and the PUSCH resource that are corresponding to the channel access request information, that is, sending of two channels PRACH and PUSCH can use a more reasonable channel access manner. In this way, reliability of sending channel access request information can be improved. In addition, the relationship between the PRACH resource and the PUSCH resource is fully considered when the channel access priority information corresponding to the PRACH resource and the channel access priority information corresponding to the PUSCH resource are determined, thereby ensuring fairness of access of different physical channels.

Figure 7:
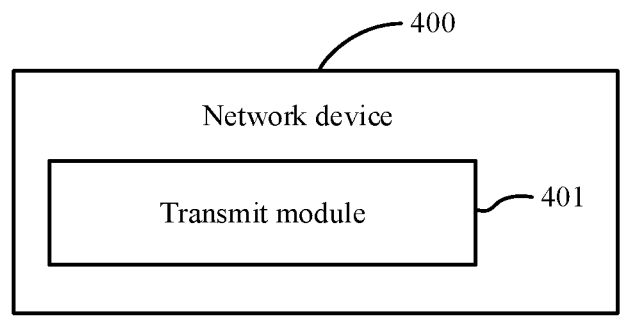
FIG. 7 is a schematic structural diagram of a network device according to an embodiment of the present disclosure.

Referring to FIG. 7, an embodiment of the present disclosure provides a network device 400. The network device 400 includes:
a transmit module 401, configured to send configuration information to a terminal device, where
the configuration information is used to instruct the terminal device to: in a case that a time-domain interval between a PRACH resource and a PUSCH resource that are corresponding to channel access request information is less than or equal to a preset value, determine that channel access priority information corresponding to the PRACH resource and channel access priority information corresponding to the PUSCH resource are first channel access priority information; or
the configuration information is used to instruct the terminal device to: in a case that a time-domain interval between a PRACH resource and a PUSCH resource is greater than a preset value, determine that channel access priority information corresponding to the PRACH resource is second channel access priority information, and determine, based on the second channel access priority information, channel access priority information corresponding to the PUSCH resource; or the configuration information is used to instruct the terminal device to: in a case that a time-domain interval between a PRACH resource and a PUSCH resource is greater than a preset value, determine that channel access priority information corresponding to the PUSCH resource is third channel access priority information, and determine, based on the third channel access priority information, channel access priority information corresponding to the PRACH resource.

It can be understood that the network device provided in this embodiment of the present disclosure can implement the above channel access method performed by the network device, and relevant descriptions of the channel access method is applicable to the network device. Details are not described herein again.

In this embodiment of the present disclosure, the configuration information is used to indicate, to the terminal device, the relationship between the PRACH resource and the PUSCH resource that are corresponding to the channel access request information, so that the terminal device determines, based on the relationship, the channel access priority information corresponding to the PRACH resource and the channel access priority information corresponding to the PUSCH resource, and sending of two channels PRACH and PUSCH can use a more reasonable channel access manner. In this way, reliability of sending channel access request information can be improved. In addition, the relationship between the PRACH resource and the PUSCH resource is fully considered when the channel access priority information corresponding to the PRACH resource and the channel access priority information corresponding to the PUSCH resource are determined, thereby ensuring fairness of access of different physical channels.

Optionally, in a case that the configuration information indicates that the time-domain interval between the PRACH resource and the PUSCH resource that are corresponding to the channel access request information is less than or equal to the preset value, the terminal device may determine that the channel access priority information corresponding to the PRACH resource and the channel access priority information corresponding to the PUSCH resource are the first channel access priority information. That is, when the PRACH resource and the PUSCH resource are relatively close to each other in time domain, the terminal device may separately send a PRACH and a PUSCH on the PRACH resource and the PUSCH resource that are corresponding to the channel access request information after detecting an idle state (or a success) in one channel access detection. In this case, channel access priority information used to send access channels PRACH and PUSCH may be determined as the same first channel access priority information. In this way, a type of channel access priority information used for sending the PRACH and the PUSCH that are corresponding to the channel access request information in shared COT can be determined.

In a case that the configuration information indicates that the time-domain interval between the PRACH resource and the PUSCH resource that are corresponding to the channel access request information is greater than the preset value, the terminal device may first determine that the channel access priority information corresponding to the PRACH resource is the second channel access priority information, and then determine, based on the second channel access priority information after determining the second channel access priority information, channel access priority information used to send a PUSCH; or the terminal device may first determine that the channel access priority information corresponding to the PUSCH resource is the third channel access priority information, and then determine, based on the third channel access priority information after determining the third channel access priority information, channel access priority information used to send a PRACH.

That is, when the PRACH resource and the PUSCH resource are far away from each other in time domain, the terminal device needs to perform channel access detection twice to send channel access request information: one time for sending the PRACH on the PRACH resource and one time for sending the PUSCH on the PUSCH resource. In this way, a case that a difference between channel access priority information of two channels is relatively large when the PRACH and the PUSCH that are corresponding to the channel access request information are separately sent in non-shared COT can be avoided, thereby avoiding a channel access request information sending failure and improving channel access efficiency.

Figure 8:
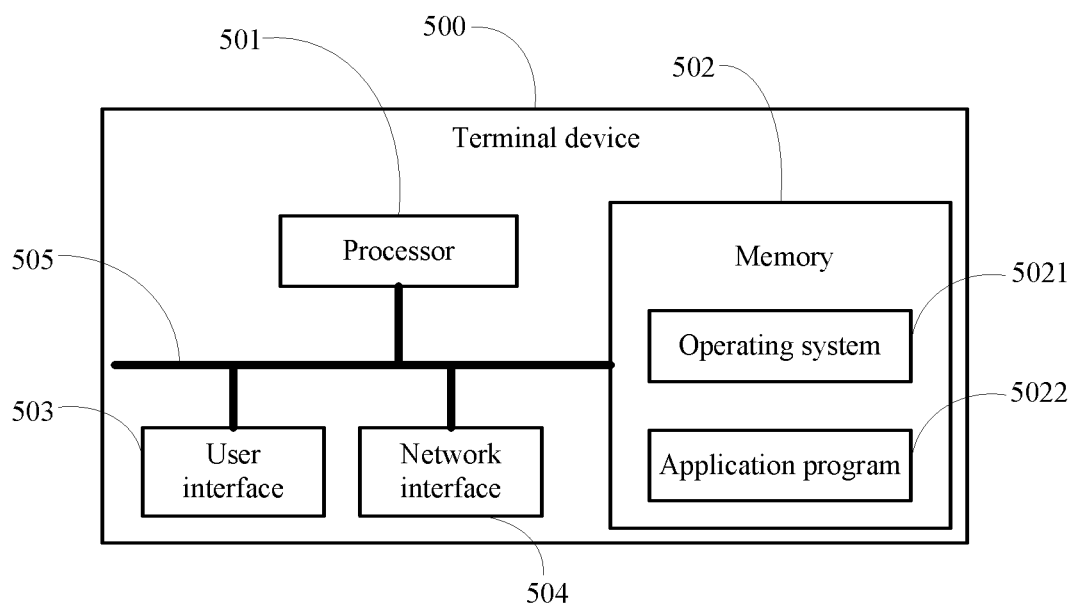
FIG. 8 is a schematic structural diagram of a second terminal device according to an embodiment of the present disclosure.

FIG. 8 is a block diagram of a terminal device according to another embodiment of the present disclosure. The terminal device 500 shown in FIG. 8 includes at least one processor 501, a memory 502, at least one network interface 504, and a user interface 503. All components of the terminal device 500 are coupled together by using the bus system 505. It can be understood that the bus system 505 is configured to implement a connection and communication between these components. In addition to a data bus, the bus system 505 may include a power bus, a control bus, and a status signal bus. However, for clear description, various types of buses in FIG. 8 are marked as the bus system 505.

The user interface 503 may include a display, a keyboard, or a clicking device (for example, a mouse, a trackball), a touch panel, or a touchscreen.

It can be understood that the memory 502 in this embodiment of the present disclosure may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory 502 in the system and the method that are described in the embodiments of the present disclosure is to include but is not limited to these memories and a memory of any other proper type.

In some implementation manners, the memory 502 stores the following element, an executable module or a data structure, or a subset thereof, or an extension set thereof: an operating system 5021 and an application program 5022.

The operating system 5021 includes various system programs, for example, a framework layer, a kernel library layer, and a driver layer. The operating system 5021 is configured to implement various basic services and process hardware-based tasks. The application program 5022 includes various application programs, for example, a media player, and a browser, to implement various application services. A program for implementing the method in the embodiments of the present discourse may be included in the application program 5022.

In this embodiment of the present disclosure, the terminal device 500 further includes a computer program that is stored in the memory 502 and executable on the processor 501, and when the computer program is executed by the processor 501, the following steps are implemented:

determining a relationship between a physical random access channel PRACH resource and a physical uplink shared channel PUSCH resource that are corresponding to channel access request information; and determining, based on the relationship, channel access priority information corresponding to the PRACH resource and channel access priority information corresponding to the PUSCH resource.

In this embodiment of the present disclosure, in a process of performing channel access based on channel access request information, channel access priority information corresponding to a PRACH resource and a PUSCH resource is determined based on a relationship between the PRACH resource and the PUSCH resource that are corresponding to the channel access request information, that is, sending of two channels PRACH and PUSCH can use a more reasonable channel access manner. In this way, reliability of sending channel access request information can be improved. In addition, the relationship between the PRACH resource and the PUSCH resource is fully considered when the channel access priority information corresponding to the PRACH resource and the channel access priority information corresponding to the PUSCH resource are determined, thereby ensuring fairness of access of different physical channels.

The methods disclosed in the foregoing embodiments of the present disclosure may be applied to the processor 501, or may be implemented by the processor 501. The processor 501 may be an integrated circuit chip and has a signal processing capability. During implementation, each step of the foregoing method may be completed by using an integrated logic circuit of hardware in the processor 501 or an instruction in a form of software. The processor 501 may be a general purpose processor, a digital signal processor (DSP), an application specific integrated circuit (ASIC), a field programmable gate array (FPGA), another programmable logic device, a discrete gate, a transistor logic device, or a discrete hardware component. The processor 501 may implement or perform the methods, the steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. A software module may be located in a mature non-transitory computer-readable storage medium in the art, such as a random access memory, a flash memory, a read-only memory, a programmable read-only memory, an electrically erasable programmable memory, a register, or the like. The non-transitory computer-readable storage medium is located in the memory 502, and the processor 501 reads information in the memory 502 and completes the steps in the foregoing method in combination with hardware of the processor 501. Optionally, the non-transitory computer-readable storage medium stores a computer program, and when the computer program is executed by the processor 501, the steps of the foregoing channel access method embodiment are implemented.

It can be understood that the embodiments described in the embodiments of the present disclosure may be implemented by hardware, software, firmware, middleware, microcode, or a combination thereof. For hardware implementation, a processing unit may be implemented in one or more Application Specific Integrated Circuits (ASIC), digital signal processors (DSP), digital signal processing devices (DSPD), programmable logic devices (PLD), field programmable gate arrays (FPGA), general purpose processors, controllers, microcontrollers, microprocessors, or other electronic units or a combination thereof used to perform the functions in the present disclosure.

For software implementation, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

The terminal device 500 can implement each process implemented by the terminal device in the foregoing embodiment. To avoid repetition, details are not described herein again.

Figure 9:
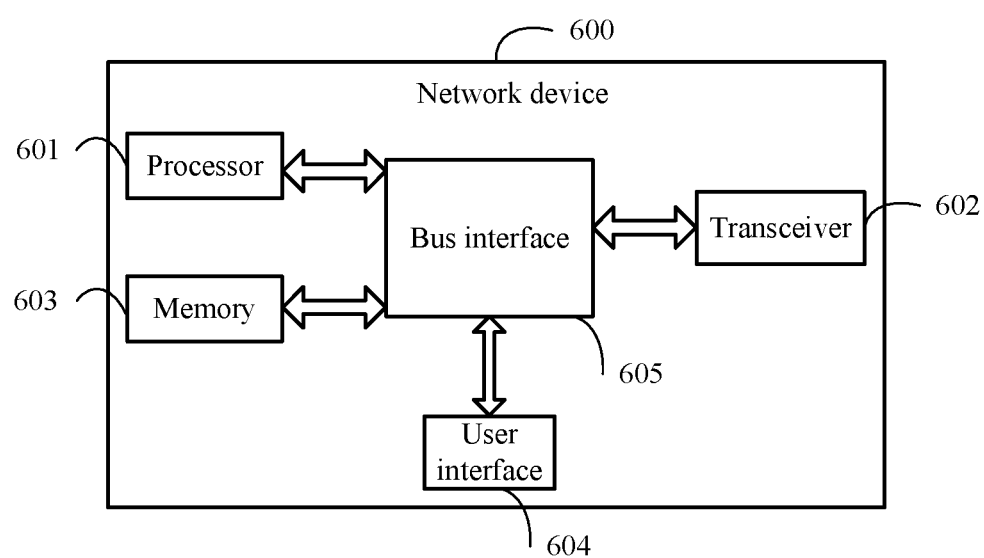
FIG. 9 is a schematic structural diagram of a second network device according to an embodiment of the present disclosure.

Referring to FIG. 9, FIG. 9 is a structural diagram of a network device applied to the embodiments of the present disclosure, and the network device can implement details of the foregoing channel access method and achieve a same effect. As shown in FIG. 9, a network device 600 includes a processor 601, a transceiver 602, a memory 603, a user interface 604, and a bus interface 605.

In this embodiment of the present disclosure, the network device 600 further includes a computer program that is stored in the memory 603 and executable on the processor 601, and when the computer program is executed by the processor 601, the following step is implemented:

sending configuration information to a terminal device, where the configuration information is used to instruct the terminal device to: in a case that a time-domain interval between a PRACH resource and a PUSCH resource that are corresponding to channel access request information is less than or equal to a preset value, determine that channel access priority information corresponding to the PRACH resource and channel access priority information corresponding to the PUSCH resource are first channel access priority information; or the configuration information is used to instruct the terminal device to: in a case that a time-domain interval between a PRACH resource and a PUSCH resource is greater than a preset value, determine that channel access priority information corresponding to the PRACH resource is second channel access priority information, and determine, based on the second channel access priority information, channel access priority information corresponding to the PUSCH resource; or the configuration information is used to instruct the terminal device to: in a case that a time-domain interval between a PRACH resource and a PUSCH resource is greater than a preset value, determine that channel access priority information corresponding to the PUSCH resource is third channel access priority information, and determine, based on the third channel access priority information, channel access priority information corresponding to the PRACH resource.

In this embodiment of the present disclosure, the configuration information is used to indicate, to the terminal device, the relationship between the PRACH resource and the PUSCH resource that are corresponding to the channel access request information, so that the terminal device determines, based on the relationship, the channel access priority information corresponding to the PRACH resource and the channel access priority information corresponding to the PUSCH resource, and sending of two channels PRACH and PUSCH can use a more reasonable channel access manner. In this way, reliability of sending channel access request information can be improved. In addition, the relationship between the PRACH resource and the PUSCH resource is fully considered when the channel access priority information corresponding to the PRACH resource and the channel access priority information corresponding to the PUSCH resource are determined, thereby ensuring fairness of access of different physical channels.

Optionally, in a case that the configuration information indicates that the time-domain interval between the PRACH resource and the PUSCH resource that are corresponding to the channel access request information is less than or equal to the preset value, the terminal device may determine that the channel access priority information corresponding to the PRACH resource and the channel access priority information corresponding to the PUSCH resource are the first channel access priority information. That is, when the PRACH resource and the PUSCH resource are relatively close to each other in time domain, the terminal device may separately send a PRACH and a PUSCH on the PRACH resource and the PUSCH resource that are corresponding to the channel access request information after detecting an idle state (or a success) in one channel access detection. In this case, channel access priority information used to send access channels PRACH and PUSCH may be determined as the same first channel access priority information. In this way, a type of channel access priority information used for sending the PRACH and the PUSCH that are corresponding to the channel access request information in shared COT can be determined.

In a case that the configuration information indicates that the time-domain interval between the PRACH resource and the PUSCH resource that are corresponding to the channel access request information is greater than the preset value, the terminal device may first determine that the channel access priority information corresponding to the PRACH resource is the second channel access priority information, and then determine, based on the second channel access priority information after determining the second channel access priority information, channel access priority information used to send a PUSCH; or the terminal device may first determine that the channel access priority information corresponding to the PUSCH resource is the third channel access priority information, and then determine, based on the third channel access priority information after determining the third channel access priority information, channel access priority information used to send a PRACH.

That is, when the PRACH resource and the PUSCH resource are far away from each other in time domain, the terminal device needs to perform channel access detection twice to send channel access request information: one time for sending the PRACH on the PRACH resource and one time for sending the PUSCH on the PUSCH resource. In this way, a case that a difference between channel access priority information of two channels is relatively large when the PRACH and the PUSCH that are corresponding to the channel access request information are separately sent in non-shared COT can be avoided, thereby avoiding a channel access request information sending failure and improving channel access efficiency.

In FIG. 9, a bus architecture may include any quantity of interconnected buses and bridges. For example, various circuits of one or more processors represented by the processor 601 and a memory represented by the memory 603 are interconnected. The bus architecture may further link various other circuits such as a peripheral device, a voltage regulator, and a power management circuit. These are well known in the art, and therefore are not further described in this specification. A bus interface 605 provides an interface. The transceiver 602 may be a plurality of components. To be specific, the transceiver 602 includes a transmitter and a receiver, and provides a unit configured to communicate with various other apparatuses on a transmission medium. For different user equipment, a user interface 604 may be an interface that can externally or internally connect to a needed device, and the connected device includes but is not limited to a keypad, a display, a loudspeaker, a microphone, and a joystick.

The processor 601 is responsible for bus architecture management and general processing. The memory 603 may store data used by the processor 601 when the processor 601 performs an operation.

Optionally, the embodiments of the present disclosure further provide a terminal device, including a processor, a memory, and a computer program that is stored in the memory and executable on the processor. When the computer program is executed by the processor, the processes of the foregoing channel access method embodiment are implemented and a same technical effect can be achieved. To avoid repetition, details are not described herein again.

The embodiments of the present disclosure further provide a non-transitory computer-readable storage medium. The non-transitory computer-readable storage medium stores a computer program, and when the computer program is executed by a processor, the processes of the foregoing channel access method embodiment applied to the terminal device are implemented and a same technical effect can be achieved. To avoid repetition, details are not described herein again. The non-transitory computer-readable storage medium includes a read-only memory (ROM), a random access memory (RAM), a magnetic disk, or an optical disc.

Optionally, the embodiments of the present disclosure further provide a network device, including a processor, a memory, and a computer program that is stored in the memory and executable on the processor. When the computer program is executed by the processor, the processes of the foregoing channel access method embodiment are implemented and a same technical effect can be achieved. To avoid repetition, details are not described herein again.

The embodiments of the present disclosure further provide a non-transitory computer-readable storage medium. The non-transitory computer-readable storage medium stores a computer program, and when the computer program is executed by a processor, the processes of the foregoing channel access method embodiment applied to the network device are implemented and a same technical effect can be achieved. To avoid repetition, details are not described herein again. The non-transitory computer-readable storage medium includes a ROM, a RAM, a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A channel access method, applied to a terminal device and comprising:
    determining a relationship between a physical random access channel (PRACH) resource and a physical uplink shared channel (PUSCH) resource that are corresponding to channel access request information; and
    determining, based on the relationship, channel access priority information corresponding to the PRACH resource and channel access priority information corresponding to the PUSCH resource; wherein
    the determining, based on the relationship, channel access priority information corresponding to the PRACH resource and channel access priority information corresponding to the PUSCH resource comprises:
    in a case that a time-domain interval between the PRACH resource and the PUSCH resource is less than or equal to a preset value, determining that the channel access priority information corresponding to the PRACH resource and the channel access priority information corresponding to the PUSCH resource are first channel access priority information;
    or
    in a case that a time-domain interval between the PRACH resource and the PUSCH resource is greater than a preset value, determining that the channel access priority information corresponding to the PRACH resource is second channel access priority information; and
    determining, based on the second channel access priority information, the channel access priority information corresponding to the PUSCH resource;
    or
    in a case that a time-domain interval between the PRACH resource and the PUSCH resource is greater than a preset value, determining that the channel access priority information corresponding to the PUSCH resource is third channel access priority information; and
    determining, based on the third channel access priority information, the channel access priority information corresponding to the PRACH resource.

2. The method according to claim 1, wherein the channel access priority information comprises at least one of a channel access priority class (CAPC) or a channel access type (CAT).

3. The method according to claim 1, wherein the first channel access priority information is determined by one of following manners:
    being specified by a protocol;
    being configured by a network device;
    being determined based on channel access priority information corresponding to service information related to an object transmitted on the PUSCH resource;
    being determined based on a trigger event of RACH access; and
    in a case that a trigger event of RACH access is that target data arrives, being determined based on channel access priority information corresponding to service information related to the target data.

4. The method according to claim 3, wherein the service information comprises at least one of:
    a logical channel identifier;
    a logical channel group identifier;
    a logical channel priority class;
    a cell identifier corresponding to a logical channel;
    a cell type identifier corresponding to a logical channel;
    a cell group corresponding to a logical channel;
    a data type; or
    a control signaling type.

5. The method according to claim 3, wherein in a case that the first channel access priority information is determined based on the channel access priority information corresponding to the service information related to the object transmitted on the PUSCH resource;
    if there are a plurality of types of the service information related to the object, and channel access priority information corresponding to different types of service information is different, target channel access priority information with a highest CAPC or a lowest CAPC is determined as the first channel access priority information.

6. The method according to claim 3, wherein the trigger event comprises one of:
    initial access in a radio resource control (RRC) idle state;
    RRC connection re-establishment;
    a case that data in an RRC connected state arrives, and an uplink synchronization state is out-of-synchronization;
    a case that uplink data in an RRC connected state arrives, and no physical uplink control channel (PUCCH) resource is used to send a scheduling request (SR);
    an SR failure;
    a synchronous reconfiguration request;
    conversion of an RRC inactive state;
    establishment of uplink timing of a secondary cell (SCell);
    a system information request; and
    a beam failure recovery.

7. The method according to claim 6, wherein channel access priority information determined based on the trigger event is configured by a network device or specified by a protocol.

8. The method according to claim 3, wherein a CAPC in the channel access priority information corresponding to the service information related to the object transmitted on the PUSCH resource is specified by a protocol, wherein the CAPC is determined based on at least one of following rules:
a higher logical channel priority class corresponds to a higher CAPC;
data with a smaller or larger logical channel number corresponds to a higher CAPC;
a CAPC corresponding to radio resource control (RRC) signaling is higher than a CAPC corresponding to data;
a CAPC corresponding to a preset Medium Access Control (MAC) control element (CE) is higher than or lower than the CAPC corresponding to the data;
a CAPC corresponding to a preset first signaling radio bearer (SRB) is higher than or lower than a CAPC corresponding to a preset second SRB; or
the CAPC corresponding to the preset MAC CE is higher than or lower than a CAPC corresponding to preset RRC signaling.

9. The method according to claim 1, wherein the second channel access priority information is determined in one of following manners:
being specified by a protocol;
being configured by a network device;
being determined based on a trigger event of RACH access; and
in a case that the trigger event of RACH access is that target data arrives, being determined based on channel access priority information corresponding to service information related to the target data.

10. The method according to claim 1, wherein the third channel access priority information is determined in one of following manners:
being specified by a protocol;
being configured by a network device;
being determined based on channel access priority information corresponding to service information related to an object transmitted on the PUSCH resource;
being determined based on a trigger event of RACH access; and
in a case that the trigger event of RACH access is that target data arrives, being determined based on channel access priority information corresponding to service information related to the target data.

11. The method according to claim 1, wherein the channel access request information is a MsgA in a 2-step random access process.

12. A non-transitory computer-readable storage medium, wherein the non-transitory computer-readable storage medium stores a computer program, and when the computer program is executed by a processor of a terminal device, the steps of the method according to claim 1 are implemented.

13. The non-transitory computer-readable storage medium according to claim 12, wherein when the computer program is executed by the processor of the terminal device, the steps of the method according to claim 4 are implemented.

14. The non-transitory computer-readable storage medium according to claim 12, wherein when the computer program is executed by the processor of the terminal device, the steps of the method according to claim 9 are implemented.

15. The non-transitory computer-readable storage medium according to claim 12, wherein when the computer program is executed by the processor of the terminal device, the steps of the method according to claim 10 are implemented.

16. A channel access method, applied to a network device and comprising:
sending configuration information to a terminal device, wherein
the configuration information is used to instruct the terminal device to: in a case that a time-domain interval between a physical random access channel (PRACH) resource and a physical uplink shared channel (PUSCH) resource that are corresponding to channel access request information is less than or equal to a preset value, determine that channel access priority information corresponding to the PRACH resource and channel access priority information corresponding to the PUSCH resource are first channel access priority information; or
the configuration information is used to instruct the terminal device to: in a case that a time-domain interval between a PRACH resource and a PUSCH resource is greater than a preset value, determine that channel access priority information corresponding to the PRACH resource is second channel access priority information, and determine, based on the second channel access priority information, channel access priority information corresponding to the PUSCH resource; or
the configuration information is used to instruct the terminal device to: in a case that a time-domain interval between a PRACH resource and a PUSCH resource is greater than a preset value, determine that channel access priority information corresponding to the PUSCH resource is third channel access priority information, and determine, based on the third channel access priority information, channel access priority information corresponding to the PRACH resource.

17. A terminal device, comprising a processor, a memory, and a computer program that is stored in the memory and executable on the processor, wherein the computer program, when executed by the processor, causes the terminal device to perform:
determining a relationship between a physical random access channel (PRACH) resource and a physical uplink shared channel (PUSCH) resource that are corresponding to channel access request information; and
in a case that a time-domain interval between the PRACH resource and the PUSCH resource is less than or equal to a preset value, determining that the channel access priority information corresponding to the PRACH resource and the channel access priority information corresponding to the PUSCH resource are first channel access priority information; or
in a case that a time-domain interval between the PRACH resource and the PUSCH resource is greater than a preset value, determining that the channel access priority information corresponding to the PRACH resource is second channel access priority information; and determining, based on the second channel access priority information, the channel access priority information corresponding to the PUSCH resource; or
in a case that a time-domain interval between the PRACH resource and the PUSCH resource is greater than a preset value, determining that the channel access priority information corresponding to the PUSCH resource is third channel access priority information; and determining, based on the third channel access priority information, the channel access priority information corresponding to the PRACH resource.

18. The terminal device according to claim 17, wherein the channel access priority information comprises at least one of a channel access priority class (CAPC) or a channel access type (CAT).

19. The terminal device according to claim 17, wherein the channel access request information is a MsgA in a 2-step random access process.

* * * * *